UNITED STATES PATENT OFFICE.

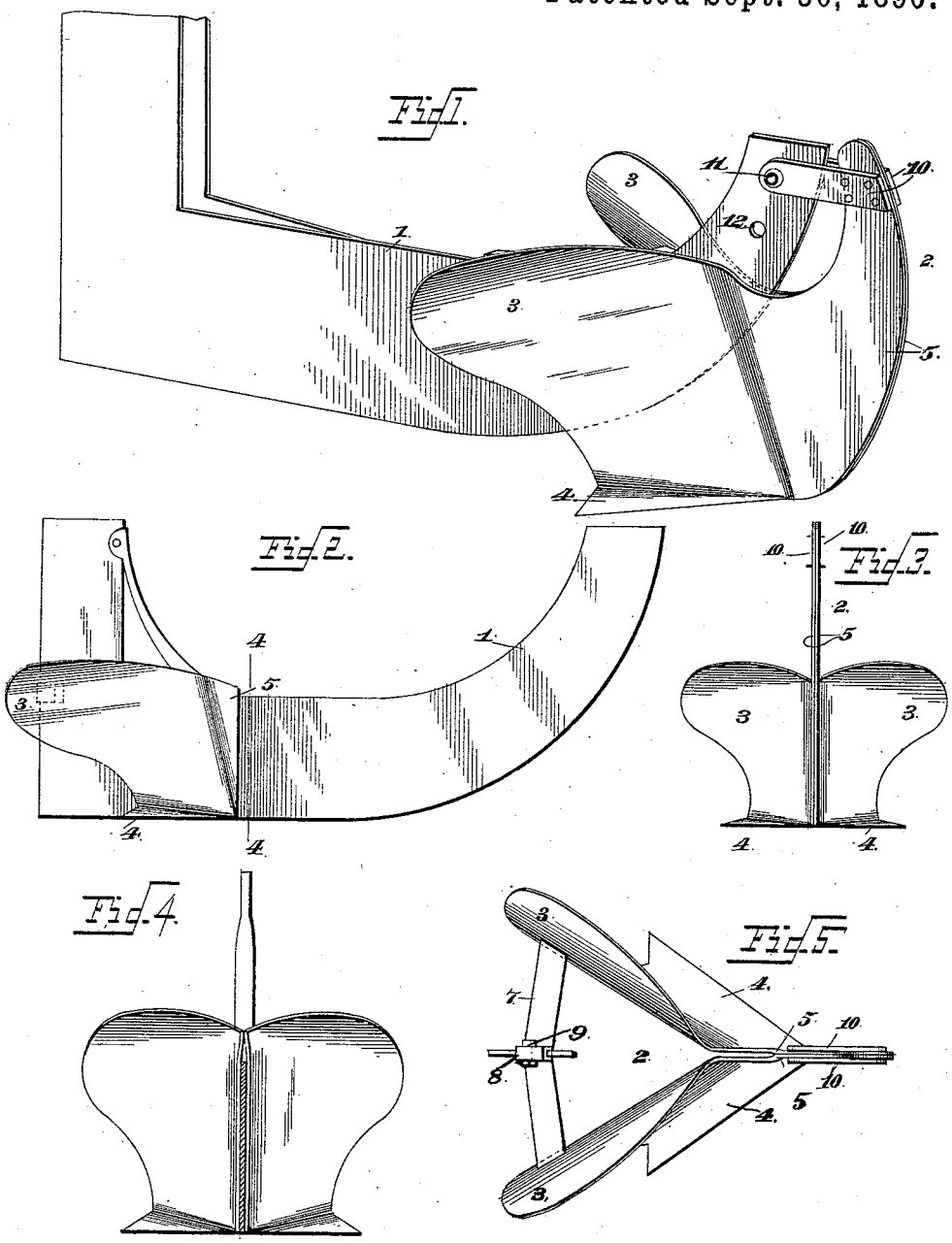

JOSEPH E. HEDGES, OF ASHVILLE, OHIO.

ATTACHMENT FOR PLANTERS.

SPECIFICATION forming part of Letters Patent No. 437,595, dated September 30, 1890.

Application filed June 20, 1890. Serial No. 356,043. (No model.)

*To all whom it may concern:*

Be it known that I, JOSEPH E. HEDGES, a citizen of the United States, residing at Ashville, in the county of Pickaway and State of Ohio, have invented a new and useful Attachment for Corn-Planters, of which the following is a specification.

The invention relates to attachments for corn-planters; and it has for its object to provide an attachment for forming a furrow having a clean-cut bed, without clods to interfere with the growing plants.

The invention is in the nature of an attachment to the furrow-opening shoe, upon which it is vertically adjustable, so as to enable the seed to be deposited at any desired depth in the ground.

With these ends in view the invention consists in the improved construction, arrangement, and combination of parts, which will be hereinafter fully described, and particularly pointed out in the claims.

In the drawings, Figure 1 is a perspective view showing the shoe of a corn-planter having my improved attachment arranged at its front end. Fig. 2 is a side elevation showing a modification whereby the attachment is arranged near the rear end of the shoe. Fig. 3 is a front elevation of the device, as shown in Fig. 1. Fig. 4 is a vertical sectional view taken on the line 4 4 in Fig. 2. Fig. 5 is a top view of the device detached from the shoe.

Like numerals of reference indicate like parts in all the figures.

1 designates the shoe of a planter, which is of ordinary construction.

2 is my improved attachment, which is in the nature of a double plow or furrow-opener, consisting of the mold-boards 3 3, having the shares 4 4. The front ends of the mold-boards are provided with forwardly-extending wings 5, which are placed closely in contact with each other, and which, when the attachment is to be arranged at the front end of the shoe, may be joined together, as shown in Fig. 1. When, however, the attachment is to be applied to the shoe at an intermediate point of the latter, the front edges of the wings 5 5 are to be separated, in order to adapt them to fit against opposite sides of the shoe.

The mold-boards 3 are connected near their rear ends by a transverse brace 7, which is to be provided with a yoke or bail 8, straddling and connected pivotally with the planter-shoe by means of a bolt 9.

The front ends of the wings 5, extending from the mold-boards 3, are to be provided with brackets 10, connected adjustably with the planter-shoe by means of bolts 11, passing through the said brackets and through any one of a series of perforations 12 in the planter-shoe.

In operation my improved attachment is secured to the shoe of the planter either at the front end or at an intermediate point of the same, substantially as will be seen in the several figures of the drawings. By adjusting the said attachments the shoe may be permitted to project any desired distance below the cutting-edges of the shares of the same, thus forming a seed-bed of any desired depth.

The furrow-openers will form a clean and smooth furrow, free from clods or other obstructions to the propagation of the plants.

Having thus described my invention, I claim—

1. The combination, with a planter-shoe, of a furrow-opening attachment comprising the mold-board, the shares, and the forwardly-extending wings having brackets connected adjustably with the said shoe, substantially as set forth.

2. The combination, with a planter-shoe, of an attachment comprising the mold-boards, the shares, the forwardly-extending wings having brackets connected adjustably with the said shoe, and the transverse braces connecting the mold-boards and having yokes or bails formed thereon and connected pivotally with the planter-shoe, substantially as set forth.

In testimony that I claim the foregoing as my own I have hereto affixed my signature in presence of two witnesses.

JOSEPH E. HEDGES.

Witnesses:
P. H. HOFFHINES,
W. E. HOOVER.